(12) United States Patent
Meyers et al.

(10) Patent No.: US 9,470,843 B2
(45) Date of Patent: Oct. 18, 2016

(54) LIGHTING SYSTEM FOR A POINTER IN A VEHICLE

(71) Applicant: VISTEON GLOBAL TECHNOLOGIES, INC., Van Buren Township, MI (US)

(72) Inventors: Scott R. Meyers, Holland, MI (US); Jonathan M. Frens, Hudsonville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/415,105

(22) PCT Filed: Jul. 18, 2013

(86) PCT No.: PCT/US2013/051108
§ 371 (c)(1),
(2) Date: Jan. 15, 2015

(87) PCT Pub. No.: WO2014/015155
PCT Pub. Date: Jan. 23, 2014

(65) Prior Publication Data
US 2015/0168644 A1 Jun. 18, 2015

Related U.S. Application Data

(60) Provisional application No. 61/673,552, filed on Jul. 19, 2012.

(51) Int. Cl.
| | |
|---|---|
| G02B 6/028 | (2006.01) |
| G01D 11/28 | (2006.01) |
| G02B 6/02 | (2006.01) |
| G01D 13/26 | (2006.01) |
| B60Q 3/04 | (2006.01) |

(52) U.S. Cl.
CPC ........... *G02B 6/02395* (2013.01); *B60Q 3/044* (2013.01); *B60Q 3/046* (2013.01); *G01D 11/28* (2013.01); *G01D 13/265* (2013.01)

(58) Field of Classification Search
CPC .. G02B 6/02395; B60Q 3/044; B60Q 3/046; G01D 11/28; G01D 13/265
USPC .......................... 116/286, 287, 288, DIG. 36
See application file for complete search history.

(56) References Cited

U.S. PATENT DOCUMENTS

| | | | |
|---|---|---|---|
| 6,980,729 B2 * | 12/2005 | Shi ................................ | 385/123 |
| 7,305,932 B2 * | 12/2007 | Hildebrand et al. .......... | 116/301 |
| 7,357,095 B1 * | 4/2008 | Fong et al. .................... | 116/286 |
| 7,665,857 B2 * | 2/2010 | Harada et al. .............. | 362/23.15 |

FOREIGN PATENT DOCUMENTS

| | | |
|---|---|---|
| DE | 10 2004 039 719 A1 | 2/2006 |
| JP | 48-012523 Y | 4/1973 |
| JP | 59-040205 A | 3/1984 |
| JP | 08-136286 A | 5/1996 |

OTHER PUBLICATIONS

Shirai, JPH08136286 A, May 31, 1996, YAZAKI Corp, English machine translation as JP08136286A_MT.*
International Search Report and Written Opinion of the International Searching Authority dated Apr. 8, 2014, in PCT/US2013/051108, 13 pages.

* cited by examiner

*Primary Examiner* — Alan Cariaso
(74) *Attorney, Agent, or Firm* — Foley & Lardner LLP

(57) ABSTRACT

A lighting system for a vehicle display includes a light source and a pointer located apart from the light source. The lighting system further includes at least one optical fiber connected between the light source and the pointer.

16 Claims, 5 Drawing Sheets

LIGHTING SYSTEM FOR A POINTER IN A VEHICLE

CROSS REFERENCE TO RELATED APPLICATIONS

The present application is a U.S. National Stage of International Application No. PCT/US2013/051108 filed on Jul. 18, 2013, which claims the benefit of U.S. Provisional Patent Application No. 61/673,552 filed on Jul. 19, 2012, the entire disclosures of all of which are incorporated herein by reference.

BACKGROUND

The present disclosure generally relates to the field of vehicles. The present disclosure relates more specifically to vehicle instrument panel indicators or other vehicle indicators.

In a vehicle, an instrument panel may use mechanical indicators or pointers to convey information to a user. The indicators may relate to, for example, vehicle performance (e.g., the speed of the vehicle, rotation speed of the engine (RPM), the percentage of fuel left in the tank, etc.). Pointers may move relative to a display surface (e.g., having hash marks, numerical indicia, etc.). In some instrument panels or other vehicle displays, the pointer and/or the display panel can be illuminated.

SUMMARY

One embodiment of the invention relates to lighting system for a vehicle display. The lighting system includes a light source, a pointer located apart from the light source, and at least one optical fiber connected between the light source and the pointer.

Another embodiment of the invention relates to a lighting system for a vehicle display. The lighting system includes a light source, a pointer, and at least one optical fiber connected between the light source and the pointer. The lighting system further includes a light shield positioned between the light source and the pointer such that the pointer only receives light from the light source via the at least one optical fiber.

Another embodiment of the invention relates to a lighting system for a vehicle display. The lighting system includes a light source, a pointer, and at least one optical fiber connecting the light source and the pointer. The at least one optical fiber has a length exceeding that of the pointer.

Another embodiment of the invention relates to a lighting system for a vehicle display. The lighting system includes a light source, a pointer, and at least one optical fiber connecting the light source and the pointer. The at least one optical fiber is positioned to flex during movement of the pointer.

Another embodiment of the invention relates to a lighting system for a vehicle display. The lighting system includes a pointer having a light receiving portion. The lighting system further includes a light source, a base positioned at the light source, and at least one optical fiber having a first end connected to the base and having a second end connected to the pointer. The base holds the at least one optical fiber for receiving light from the light source. The connection between the pointer and the at least one optical fiber provides light to the light receiving portion of the pointer.

The lighting system may further include a motor and a frame caused to be moved by the pointer and carrying the pointer for movement. The shaft coupling the motor and the frame may be at least partially hollow and light from the at least one optical fiber may be transmitted through the shaft. The base may be held within the shaft and the light source may be positioned beneath the motor. The at least one optical fiber may extend through the shaft and along the frame to the light receiving portion of the pointer. The at least one optical fiber may extend through the shaft and though a cavity within the frame to the light receiving portion of the pointer. The at least one optical fiber may be at least one of glass and plastic. The at least one optical fiber may include or be surrounded by a light absorbing buffer or jacket layer.

In some embodiments, the lighting system may further include a second light source, a second optical fiber, and a second light receiving portion of the pointer. The second optical fiber may connect the second light source and the second light receiving portion of the pointer such that light from the second light source illuminates an outlet on the pointer optically connected to the second light receiving portion. The lighting system may further include a controller configured to controllably adjust the light provided from the second light source and the light source.

The light receiving portion may be a waveguide formed within the housing of the pointer and having an outlet along at least one edge of the pointer. The at least one optical fiber may be or include a bundle of fibers. Different fibers of the bundle may provide light to different locations on the pointer. Different fibers of the bundle may receive light from different light sources. The lighting system may further include a controller configured to illuminate the different light sources at different times such that different locations of the pointer are illuminated according to control logic of the controller. The controller, for example, may be configured to cause more of the pointer to illuminate as the position of the pointer changes. The pointer, for example, may indicate at least one of revolutions per minute and speed and the controller may cause an additional light source to illuminate an additional portion of the pointer when revolutions per minute or speed increases past a threshold. The controller may be configured to change the color of the pointer via the plurality of light sources as the position of the pointer changes. The color of the pointer may be configured to change when speed or revolutions per minute exceed a threshold.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Referring generally to the figures, a lighting system for a pointer of a vehicle interior component is shown and described, according to varying exemplary embodiments. The lighting system may be configured to illuminate a portion of the pointer. The lighting system includes at least one optical fiber. The at least one optical fiber is configured to receive light from a light source outside of the pointer body or at a base of the pointer body. Light is carried to at least a portion of the pointer body (e.g., a light catching or light directing portion) via the optical fiber.

The light source may be a light emitting diode (LED). The configuration of the lighting system as shown in the present disclosure advantageously allows the light sources (e.g., LEDs, incandescent bulbs, etc.) to be located somewhat remotely from the pointer or the instrument panel at which the pointer is located. For example, the lighting system may include a centrally located array of LEDs. The array of LEDs may feed into optical fibers that feed into the various pointers of the vehicle display. The LEDs themselves may be located in a temperature controlled environment and may be in light sealed casing to improve efficiency and lifespan of the LEDs.

Figure 1:
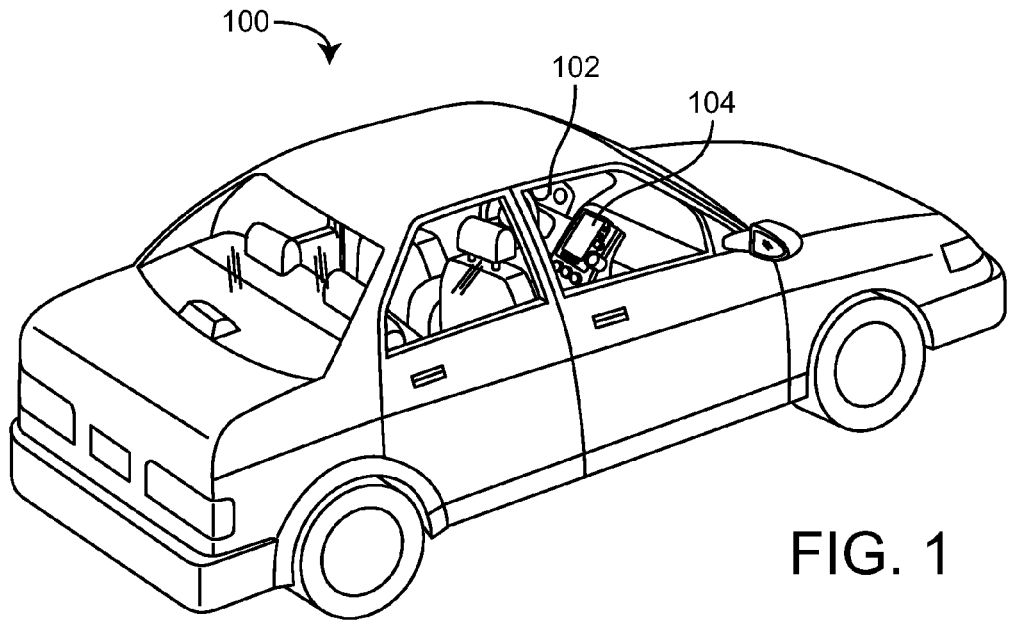
FIG. 1 is a perspective view of a vehicle including an instrument panel, according to an exemplary embodiment.
Figure 2:
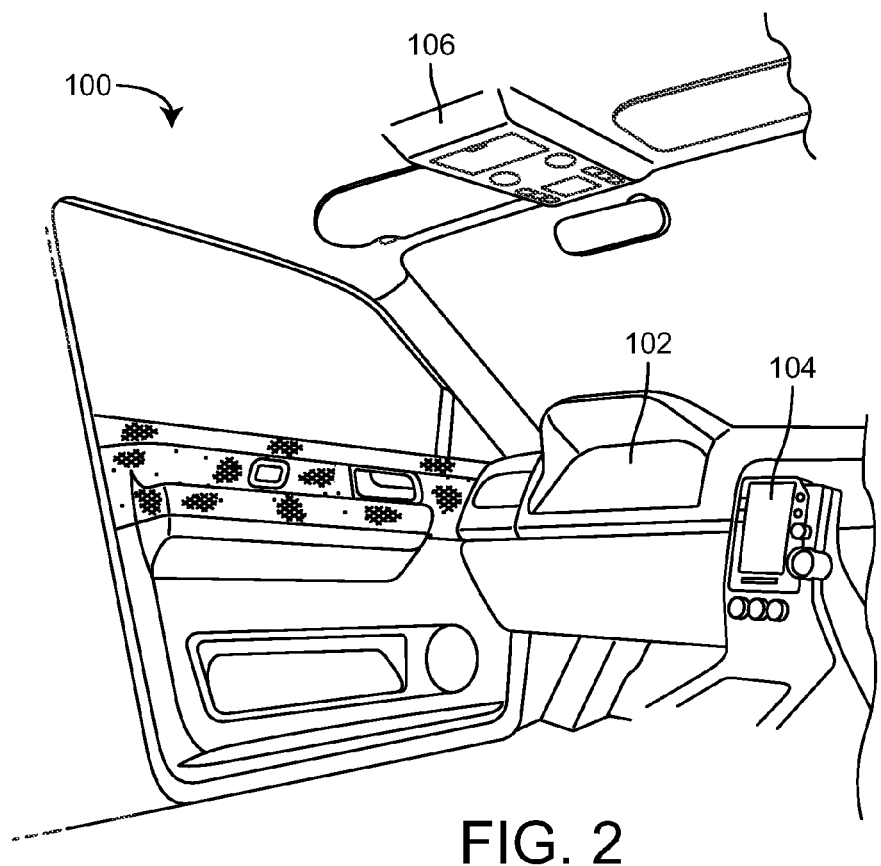
FIG. 2 is a detailed view of the interior of the vehicle of FIG. 1, according to an exemplary embodiment.

Referring now to FIG. 1, a perspective view of a vehicle 100 is shown. Vehicle 100 may generally include an instrument panel 102 and other interior components (e.g., a vehicle control system, an overhead display, etc.). Referring also to FIG. 2, the interior of vehicle 100 is shown in greater detail. Instrument panel 102 is shown located on the dashboard of vehicle 100, and is traditionally mounted behind the steering wheel. The interior of vehicle 100 may further include display panels located in other locations such as vehicle control system display 104 or overhead display 106.

While the present disclosure describes a lighting system for a pointer of a vehicle instrument panel component, it should be understood that the lighting system may be provided for a pointer or pointer-like indicator having the optical fiber configuration of the present invention that is located elsewhere in the vehicle. For example, the lighting system for a pointer may be provided for a pointer located in or around vehicle control system display 104, overhead display 106, or another display located anywhere in vehicle 100.

Figure 3:
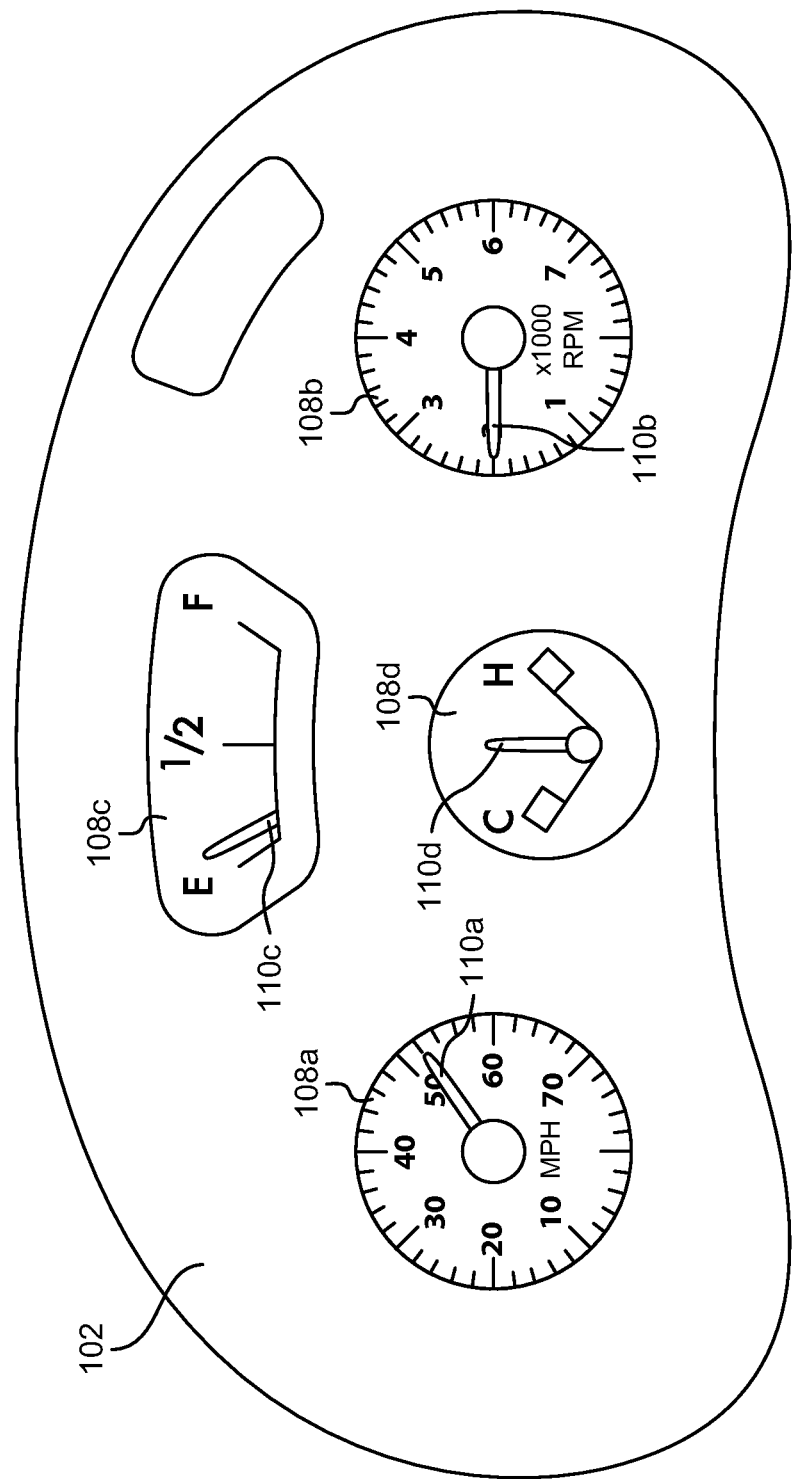
FIG. 3 is a detailed view of the instrument panel of FIGS. 1-2, including multiple gauges and pointers, according to an exemplary embodiment.
Figure 6:
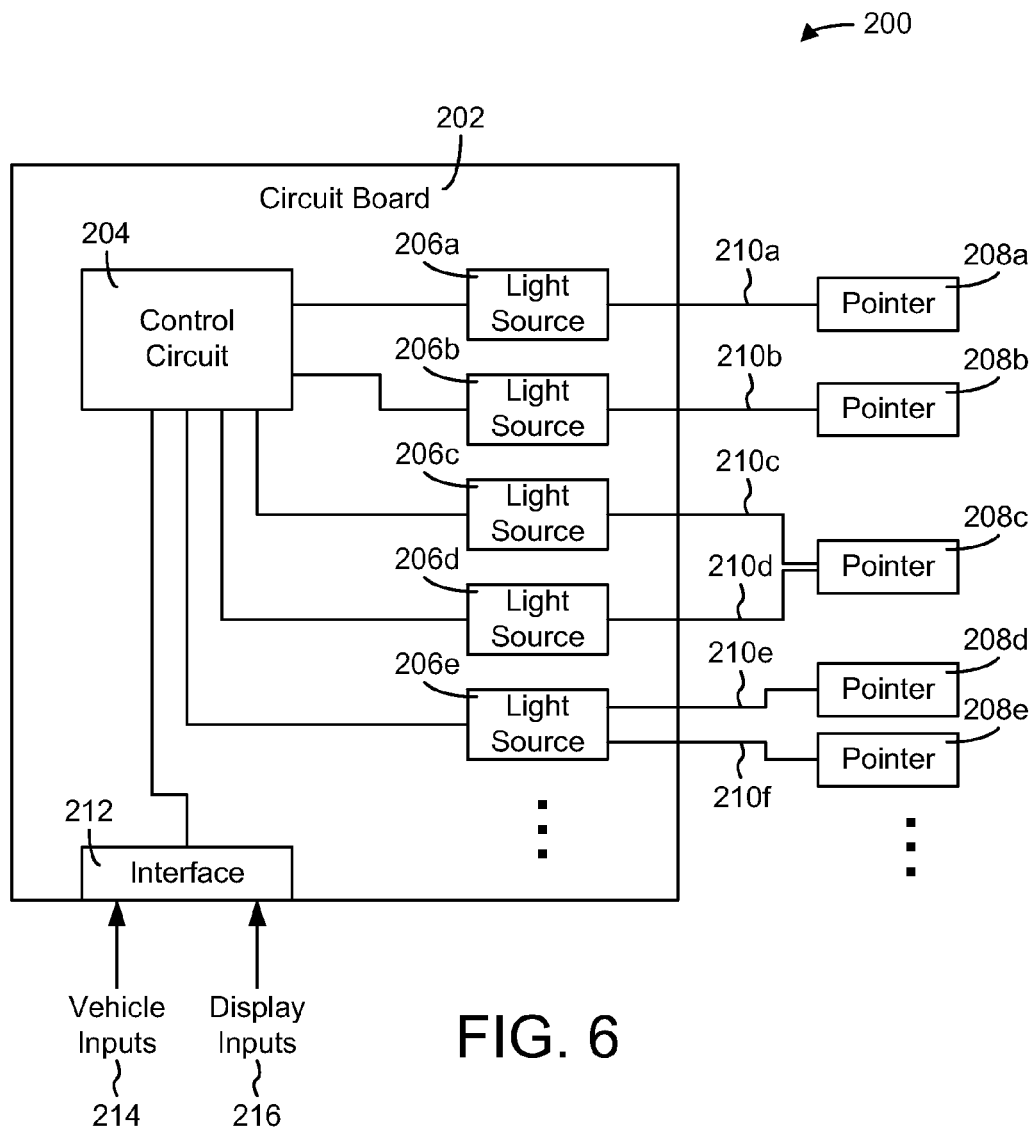
FIG. 6 is a schematic diagram of the lighting system of the present disclosure, according to an exemplary embodiment.

Referring now to FIG. 3, a more detailed view of instrument panel 102 is shown. Instrument panel 102 is shown to include various indicators 108a-d of vehicle performance. For example, instrument panel 102 includes a vehicle speed gauge 108a that indicates the speed of vehicle 100. As another example, instrument panel 102 includes an RPM gauge 108b that indicates the rotation speed of the engine. As another example, instrument panel 102 includes a fuel gauge 108c that indicates the amount of fuel in the tank of vehicle 100. As yet another example, instrument panel 102 includes a temperature gauge 108d that indicates the temperature of the engine coolant. Instrument panel 102 may further include various other gauges and indicators that illustrate vehicle performance, statistics, or settings. Gauges 108a-d each include a pointer 110a-d that indicates a value for a user (e.g., a driver) of vehicle 100. Gauges 108a-d are shown as circular or semi-circular dials; in various embodiments, the gauges may be of any shape or type that displays information using a pointer. The position of pointers 110a-d may be controlled by a vehicle control system or, for example, a control circuit as shown in FIG. 6.

Figure 4:
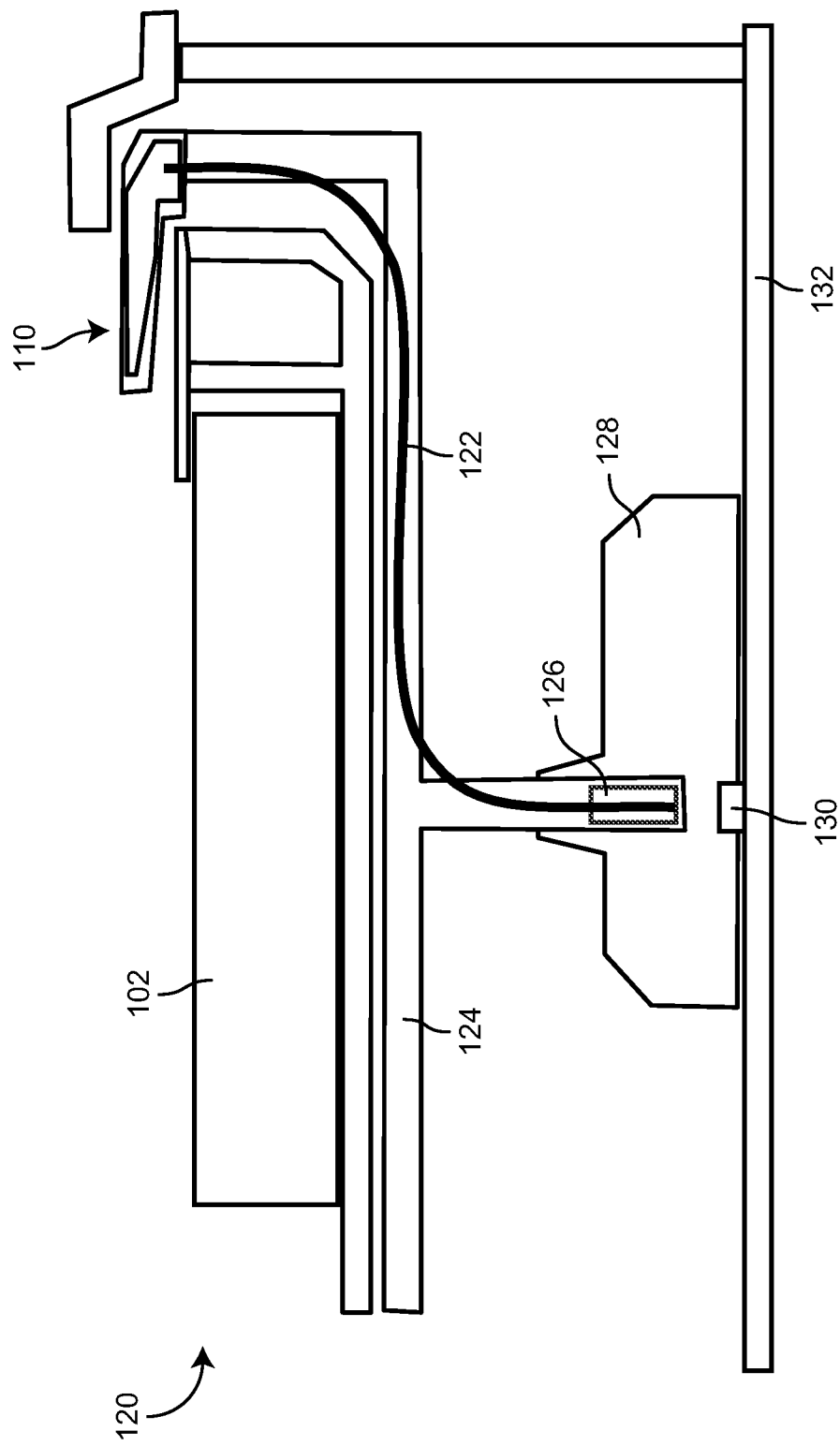
FIG. 4 is a detailed view of a lighting assembly including a pointer and instrument panel assembly, according to an exemplary embodiment.

Referring now to FIG. 4, a detailed view of a lighting assembly 120 including a pointer 110 and instrument panel 102 assembly is shown, according to an exemplary embodiment. Lighting assembly 120 is configured to allow a portion of pointer 110 located on top of instrument panel 102 to be illuminated using a remote light source 130. Pointer 110 is shown located on top of instrument panel 102; in other embodiments pointer 110 may be located elsewhere around instrument panel 102. Lighting assembly 120 is shown to further include a motor 128 for rotating pointer 110 and/or supplying power to a circuit board 132, a frame 124 for coupling pointer 110 to motor 128, and light source 130 coupled to a circuit board 132.

Pointer 110 is shown as coupled to a light source 130 (e.g., an LED) via a fiber optic cable 122. Fiber optic cable 122 transmits light from remote light source 130 to a light receiving portion of pointer 110. Fiber optic cable 122 may advantageously allow light source 130 to be located remotely from pointer 110 without having to make extensive use of solid waveguides. For example, the entirety of frame 124 coupling pointer 110 to motor 128 need not be a waveguide for guiding light to pointer 110.

One or more light sources may be located at a central location in the vehicle, and a fiber optic cable may run in between the pointer and one or more light sources designated for the pointer. Moreover, in one embodiment, a single light source may be used to provide light to more than one fiber optic cable and pointer. One or more of the optical fibers may provide light to one pointer while another optical fiber may carry light to another pointer or another instrument panel feature. In the embodiment of FIG. 4, light source 130 is shown on a circuit board 132 of vehicle 100 and is installed to project through a bore formed in the axis of motor 128. An axle moved by motor 128 may be partially hollow and contains a base 126 that holds fiber optic cable 122 in place. Because fiber optic cable 122 is flexible, the movement of pointer 110 may advantageously have minimal impact on the operation of the lighting system.

While circuit board 132 is shown as having a single light source 130 beneath motor 126 and on-axis with the axle of pointer frame 124, fiber optic cable 122 may be used to couple pointer 110 to light sources in other locations. For example, a light source may be mounted away from motor 128 (e.g., such that they do not share an axis). Fiber optic cable 122 may extend up to pointer 110 with enough extra length or freedom of movement such that the fiber can flex to any valid position for pointer 110. In another embodiment, base 126 shown inside motor 128 may be replaced with a light source and may itself be the light source for pointer 110.

Circuit board 132 may additionally include additional light sources and other circuitry as shown in FIG. 6. Light source 130 may be a single light source (e.g., a single LED) or a combination of light sources (e.g., an array of LEDs).

Figure 5:
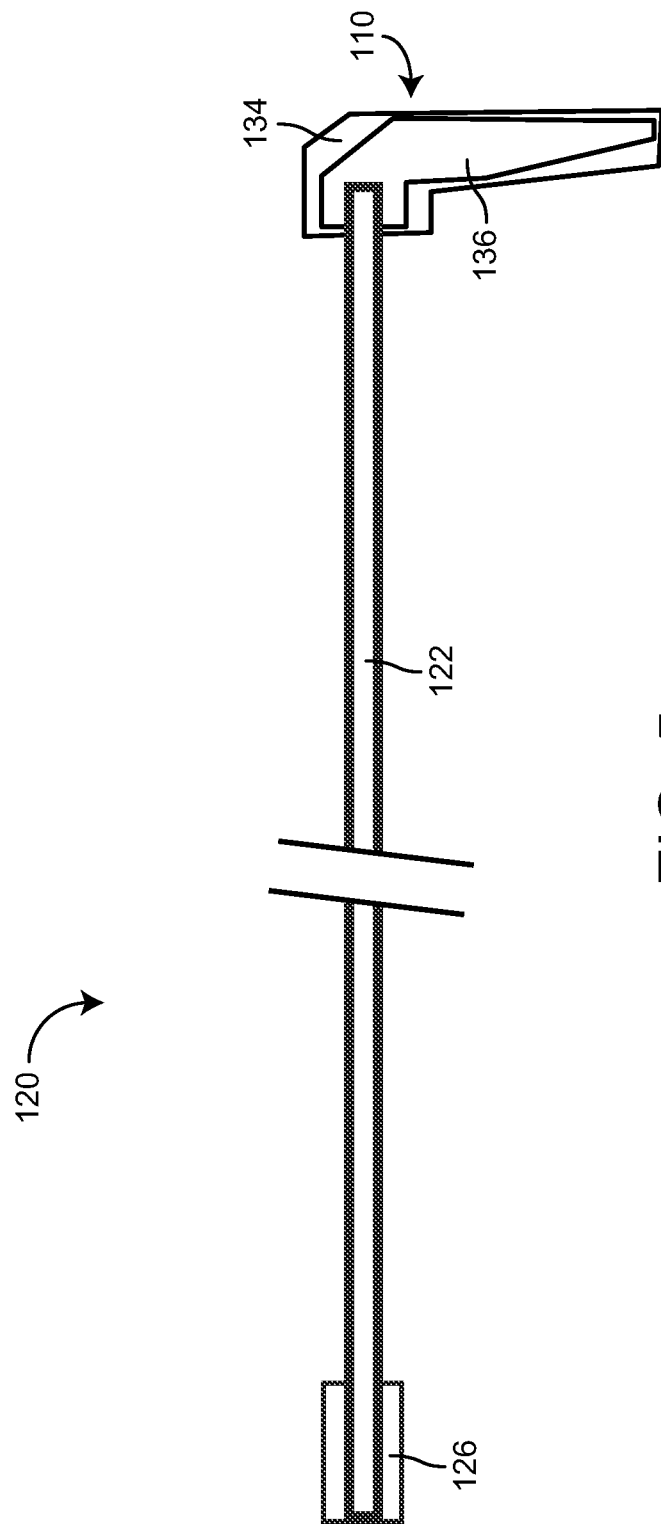
FIG. 5 is another detailed view of the lighting assembly of FIG. 4, according to an exemplary embodiment.

Referring also to FIG. 5, another detailed view of lighting assembly 120 is shown that illustrates just pointer 110, fiber optic cable 122, and base 126. Fiber optic cable 122 may be coupled to a light source and be held in place at the light source end by base 126. Base 126 may be configured to hold an end of fiber optic cable 122 in place and optically coupled to the light source. Base 126 may be embedded within a frame 124 (as shown in FIG. 4) configured to provide support for instrument panel 102. In other embodiments, the base 126 and fiber optic cable 122 assembly may be independent of frame 124. Frame 124 may be held in place by motor 128. In other embodiments, the assemblies of frame 124 and motor 128 may be independent. According to various other embodiments, lighting assembly 120 may vary (e.g., the base may be located outside of the frame, or any other method of support for the fiber-optic cable to run from the light source to the pointer may be used).

In the embodiments of FIGS. 4-5, fiber-optic cable 122 is coupled to and directed toward the bottom of pointer 110. In varying embodiments, fiber optic cable 122 may be coupled to or directed toward other portions or surfaces of pointer 110. In various embodiments, more than one fiber optic cable may be coupled to the pointer (see FIG. 6), and each of the fiber optic cables may be directed to different locations within the pointer. The fiber optic cables may be held against the pointer or another structure of the vehicle display via one or more clips. The fiber optic cable may also or alternatively be held to the pointer or another structure of the vehicle display via an adhesive, a channel, a bracket, or another coupling mechanism.

Pointer 110 is shown to include an outer housing portion 134 and an inner portion 136 optically coupled to fiber optic cable 122. Inner portion 136 may include a clip, ridge, hook, mouth, neck, or another fastening component to couple and hold fiber optic cable 122 to a light guide within pointer 110. Inner portion 136 may form a light guide or waveguide having a geometry for directing light to an edge or point on pointer 110 visible on instrument panel 102 or another display. Inner portion 136 may include, for example, a transparent core surrounded by a coating or cladding material having a lower index of refraction than the core. The light guide may be positioned within pointer 110 to direct the light out of the pointer at one or more locations. The locations at which light is directed out may be defined by housing portion 134, according to an exemplary embodiment.

Referring now to FIG. 6, a schematic diagram of a lighting system 200 is shown in greater detail. Lighting system 200 may generally include a circuit board 202 including control circuit 204 for controlling a plurality of light sources 206*a-e*. Light sources 206*a-e* may be, for example, an array of LEDs. Light sources 206*a-e* are coupled to a plurality of pointers 208*a-e* via fiber optic cables 210*a-f*. Pointers 208*a-e* may be located in the same or different interior components of the vehicle.

Control circuit 204 may include logic configured to drive each light source 206*a-e* differently. For example, control circuit 202 may be configured to concurrently, for each light source, adjust the intensity of the light, whether the light is on or off, or a color of the light. In other words, control circuit 202 may be configured to selectively emit light to a plurality of pointers 208*a-e* in controlled and different ways.

Control circuit 204 may receive vehicle inputs 214 from an engine control unit or vehicle data bus related to, for example, the motor RPM, the vehicle speed, the amount of fuel left in the vehicle tank, or other vehicle data. Control circuit 204 may further receive display inputs 216 related to pointer activity from other control circuits in the vehicle. Some of the pointer states, for example, may be obtained from received display inputs rather than received vehicle inputs. An example of a display input may be a command (either user-generated or generated by a vehicle control system) relating to pointer color, brightness, movement position, or another pointer state. Inputs 214, 216 may be received at an input interface 212 configured to receive the inputs via a wired or wireless connection.

Control circuit 204 may generally include a processor a memory. The processor may be implemented as a general purpose processor, an application specific integrated circuit (ASIC), one or more field programmable gate arrays (FPGAs), a group of processing components, or other suitable electronic processing components. The memory may be one or more devices (e.g., ROM, RAM, flash memory, hard disk storage, etc.) for storing data and/or computer code for completing and/or facilitating the various processes or steps described in the present disclosure. The memory may be or include volatile memory or non-volatile memory. The memory may include database components, object code components, script components, or any other type of information structure for supporting the various activities described herein. The memory is communicably connected to the processor and includes computer code for executing the processes described herein.

Using inputs 214, 216 received at input interface 212, control circuit 204 may determine an appropriate lighting state for each of light sources 206*a-e*. If a pointer is moving, the corresponding light source may vary in intensity to more clearly identify the changing vehicle status. For example, as a speed of the vehicle increases past a certain threshold (e.g., 70 mph), control circuit 204 may cause a new portion of a speedometer pointer 208*a* to be illuminated indicating the high speed by varying the intensity of light source 206*a*. In various exemplary embodiments, the threshold may be user set via a graphical user interface shown on the vehicle control system, or may be a pre-set value.

As another example, if a pointer 208*b* indicates a potential problem with the vehicle, such as low fuel, corresponding light source 206*b* may be configured to turn on and off, making pointer 208*b* blink. As yet another example, if the vehicle is being driven at night, an input indicating as such may be used by the control circuit 204 to provide additional light for each pointer 208*a-e* via light sources 206*a-e*. The use of fiber optic cables may advantageously provide for higher resolution pointer illumination.

The light sources as described in the present disclosure may be any suitable device configured to emit sufficient light to illuminate the pointers, such as an LED, incandescent bulb, or a fluorescent bulb, for example. In one embodiment, circuit board 202 may be manufactured using light sources having substantially similar colors and/or intensities (e.g., selected from the same bin). Consequently, the illuminated surfaces (e.g., the pointers) may provide substantially uniform lighting across all illuminated surfaces in an area (e.g., such as the instrument panel). In another embodiment, the light sources may have varying colors and/or intensities, and may provide various lighting settings across the illuminated surfaces in the area. Circuit board 202 may be placed within a structure that has sufficient room to accommodate the dimensions of the board, as compared to a confined structure such as an instrument panel area.

It should be appreciated that varying combinations of pointers and light sources may be implemented with lighting system 200. For example, in the embodiment shown in FIG. 6, two light sources 206*c*, 206*d* may provide light to a single pointer 208*c* via the two corresponding fiber optic cables 210*c*, 210*d*. As another example, light from a single light source 206*e* may be provided to multiple pointers 208*d*, 208*e* via multiple fiber optic cables 210*e*, 210*f*. Lighting system 200 may include any number of pointers, light sources, and fiber optic cables.

Multiple light sources may be configured to provide light to a single pointer. Using such a configuration, various types of lighting may be provided to the pointer. For example, two light sources may be of different colors, and the light provided to a pointer may alternate between the two colors or be a blend of the two colors. As another example, two light sources may be used to provide various lighting effects to a pointer (e.g., a glowing light, a blinking light, a light that varies intensity, etc.). As yet another example, a light source may be a tricolor LED configured to emit a variety of colors via a combination of red, green, and blue color elements, and may provide a multi-color light to a pointer.

In one embodiment, two (or more) light sources for a single pointer may each be provided to a portion of the pointer. For example, an upper, lower, left, right, or other portion of the pointer may have a different light source than another portion. Fiber optic cables may be coupled to the different portions of the pointer to provide for varying illumination of the different portions. Each fiber optic cable may be coupled to a different light source.

In one embodiment, two (or more) light sources for a single pointer may each be provided to the pointer. One of the light sources may provide a glow effect to the pointer, while the other light source provides a more standard light for display. In another embodiment, the two or more light sources may be of two or more separate colors, and the fiber-optic cables are optically coupled to the pointer such that one color is a primary display color of the pointer and the other color is a background or overlapping color. It should be understood that the lighting assembly described herein may be adjusted to include any number of light sources, fiber-optic cables, and pointers without departing from the scope of the present disclosure.

The fiber optic cables of the present disclosure may be any type of fiber-optic cable. The fiber optic cables may be a made of glass or plastic and may include any number of cladding layers coated with polymer.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

What is claimed is:

1. A lighting system for a vehicle display, comprising:
a pointer having a light receiving portion;
a light source;
a base positioned proximate to the light source;
a motor:
a frame caused to be moved by the pointer and carrying the pointer for movement;
an axle coupling the motor and the frame; and
at least one optical fiber having a first end connected to the base and having a second end connected to the pointer;
wherein the base holds the at least one optical fiber for receiving light from the light source, wherein the connection between the pointer and the at least one optical fiber provides light to the light receiving portion of the pointer, wherein the axle is at least partially hollow and light from the at least one optical fiber is transmitted through the axle, and wherein the base is held within the axle and the light source is positioned beneath the motor.

2. The lighting system of claim 1,
wherein the at least one optical fiber has a length exceeding that of the pointer.

3. The lighting system of claim 1,
wherein the at least one optical fiber is positioned to flex during movement of the pointer.

4. The lighting system of claim 1, wherein the at least one optical fiber extends through the axle and along the frame to the light receiving portion of the pointer.

5. The lighting system of claim 1, wherein the at least one optical fiber extends through the axle and though a cavity within the frame to the light receiving portion of the pointer.

6. The lighting system of claim 1, wherein the at least one optical fiber is at least one of glass and plastic, and wherein the at least one optical fiber comprises a transparent core surrounding by a coating or cladding material, the coating or cladding material having a lower index of refraction than the transparent core.

7. The lighting system of claim 1, further comprising:
a second light source;
a second optical fiber; and
a second light receiving portion of the pointer;
wherein the second optical fiber connects the second light source and the second light receiving portion of the pointer such that light from the second light source illuminates an outlet on the pointer optically connected to the second light receiving portion.

8. The lighting system of claim 7, further comprising:
a controller configured to controllably adjust the light provided from the second light source and the light source.

9. The lighting system of claim 1, wherein the light receiving portion is a waveguide formed within a housing of the pointer and having an outlet along at least one edge of the pointer.

10. The lighting system of claim 1, wherein the at least one optical fiber comprises a bundle of fibers and wherein different fibers of the bundle provide light to different locations on the pointer.

11. The lighting system of claim 10, wherein different fibers of the bundle receive light from different light sources.

12. The lighting system of claim 11, further comprising:
a controller configured to illuminate the different light sources at different times such that different locations of the pointer are illuminated according to control logic of the controller.

13. The lighting system of claim 12, wherein the controller is configured to cause more of the pointer to illuminate as the position of the pointer changes.

14. The lighting system of claim 13, wherein the pointer indicates at least one of revolutions per minute and speed, and wherein the controller causes an additional light source to illuminate an additional portion of the pointer when revolutions per minute or speed increases past a threshold.

15. The lighting system of claim 14, wherein the controller is configured to change the color of the pointer via the plurality of light sources as the position of the pointer changes.

16. The lighting system of claim 15, wherein the color of the pointer is configured to change when revolutions per minute or speed exceed a threshold.

* * * * *